United States Patent [19]
Ichihashi et al.

[11] Patent Number: 5,886,773
[45] Date of Patent: *Mar. 23, 1999

[54] METHOD AND APPARATUS FOR CONTROLLING EXPOSURE

[75] Inventors: Mitsuyoshi Ichihashi; Koichi Kimura, both of Shizuoka, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 607,933

[22] Filed: Feb. 28, 1996

[30] Foreign Application Priority Data

Feb. 28, 1995 [JP] Japan ................................. 7-040494

[51] Int. Cl.⁶ .................................................. G03B 27/72
[52] U.S. Cl. ............................................... 355/35; 355/67
[58] Field of Search ..................... 355/35, 67; 345/63, 345/77; 349/25, 30, 19, 33

[56] References Cited

U.S. PATENT DOCUMENTS

| | | | |
|---|---|---|---|
| 3,906,290 | 9/1975 | Kurahashi et al. | 315/169 R |
| 5,159,456 | 10/1992 | Takanashi et al. | 358/213.13 |
| 5,325,107 | 6/1994 | Ogawa et al. | 345/79 |
| 5,327,263 | 7/1994 | Katagiri et al. | 358/471 |
| 5,416,561 | 5/1995 | Sawano et al. | 355/43 |
| 5,528,392 | 6/1996 | Nakagawa et al. | 359/41 |
| 5,541,618 | 7/1996 | Shinoda | 345/60 |
| 5,614,990 | 3/1997 | Bruce et al. | 355/71 |

*Primary Examiner*—Safet Metjahic
*Assistant Examiner*—John Chizmar
*Attorney, Agent, or Firm*—Sughrue, Mion, Zinn, Macpeak & Seas, PLLC

[57] ABSTRACT

A method and an apparatus for controlling exposure are disclosed. A light beam carrying gradation image information is projected to writing side of spatial light modulating means and another light beam is projected to reading side of the modulating means to obtain a light beam for exposure in accordance with the intensity of the light beam to the writing side. By varying the reflectance on the reading side in accordance with the gradation image information, the light beam for exposure is obtained and the amount of exposure is controlled. The reflectance on the reading side is controlled by continuously varying the intensity of the light to the writing side and/or by continuously varying the driving voltage of the modulating means.

9 Claims, 5 Drawing Sheets

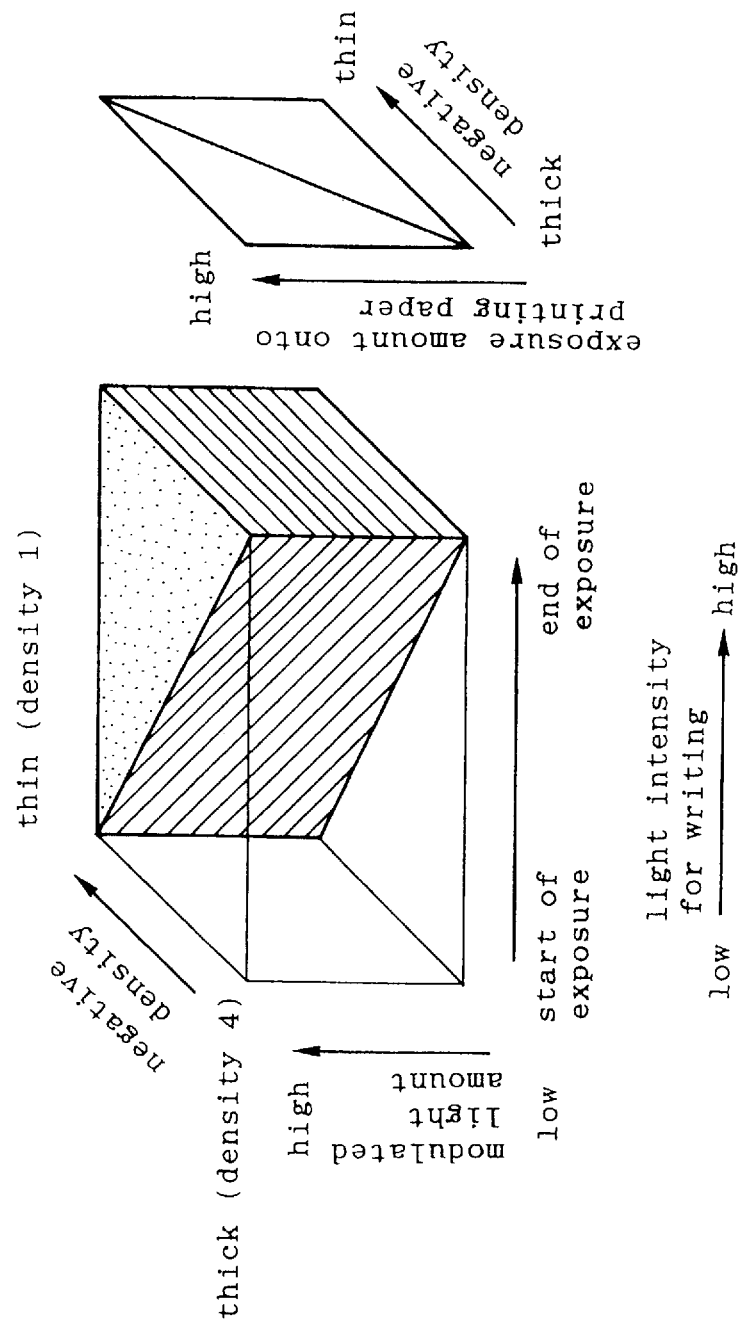

METHOD AND APPARATUS FOR CONTROLLING EXPOSURE

FIELD OF THE INVENTION

The present invention relates to a method and an apparatus for controlling exposure in a photographic printer, a copying machine or the like, and particularly to a method and an apparatus for controlling exposure, which can obtain a desired gradation by using spatial light modulating means (hereinafter referred to as SLM).

BACKGROUND OF THE INVENTION

As the means of controlling exposure in a photographic printer or a copying machine, there has been recently known a system using a liquid crystal element. When gradation is obtained by using the liquid crystal element, transmitted light is modulated by utilizing a gradation characteristic of the liquid crystal element itself. The gradation characteristic of the liquid crystal itself depends upon a threshold characteristic. The more gradually the threshold characteristic varies, much gradations to be obtained.

When a gradation image is exposed, it is preferable that it should be exposed with much gradations as possible. However, only 32 gradations or thereabouts are obtained in the present circumstances, and only 64 gradations or thereabouts are obtained in an experimental stage. On the other hand, in a photographic printer, multi-gradation exposure of 1024 gradations is required.

Further, since a liquid-crystal operation mode in which the liquid crystal itself has a middle tone characteristic is restricted, the degree of design freedom of a liquid crystal element is limited. As a result, it is difficult to provide a desirable modulating element at a low cost.

SUMMARY OF THE INVENTION

In view of the above-described circumstances, it is an object of the present invention to provide a method and an apparatus for controlling exposure, which is capable of exposing a multi-gradation image.

The method in accordance with the present invention for controlling exposure comprises the steps of: providing spatial light modulating means having a writing portion to which a light beam carrying the gradation image information is projected and a reading portion from which a light beam for exposure is obtained in accordance with the intensity of the light beam to the writing portion; projecting the writing portion with the light beam carrying the gradation image information; and while projecting the reading portion with another light beam, varying the reflectance on the reading portion in accordance with the gradation image information to obtain the light beam for exposure and to control the amount of exposure.

The apparatus in accordance with the present invention for controlling exposure comprises: spatial light modulating means having a writing portion to which a light beam carrying gradation image information is projected and a reading portion from which a light beam for exposure is obtained; means for producing the light beam carrying the gradation image information and to be projected to the writing portion; means for projecting another light beam to the reading portion to obtain the modulated light beam for exposure; means for receiving the modulated light beam from the reading portion; and means for varying reflectance on the reading portion in accordance with the gradation image, to be exposed to the receiving means.

When the intensity of the light to the spatial light modulating means and/or the driving voltage of the means are variably controlled according to the present invention, the reflectance on the reading side of the spatial light modulating means varies. As a result, the photosensitive material can be exposed in accordance with gradation.

The intensity of the light for writing and the driving voltage can be varied substantially linearly, and the reflectance on the reading side of the spatial light modulating means can also vary in response to the change of the intensity of the light for writing and the driving voltage. Accordingly, the amount of light emitted from the reading side of the spatial light modulating means can be continuously controlled, so that a multi-gradation image can be exposed onto the photosensitive material.

As the means for forming the light for writing which is made incident on the writing side of the spatial light modulating means, light transmitted through a film image, a laser beam, an electron beam, or the like may be used, each of which intensity is modulated in accordance with image information.

As the means for receiving the light for reading which is modulated by the spatial light modulating means, suitable photosensitive material may be selected in accordance with the character of the light for reading.

A well-known liquid-crystal drive and control such as frequency modulation or amplitude modulation is applicable to the driving voltage.

BRIEF DESCRIPTION OF THE DRAWINGS

FIGS. 4A and 4B are diagrams each showing an growing characteristic of an integrated amount of incident light on the printing paper.

DESCRIPTION OF THE PREFERRED EMBODIMENTS

Figure 1:
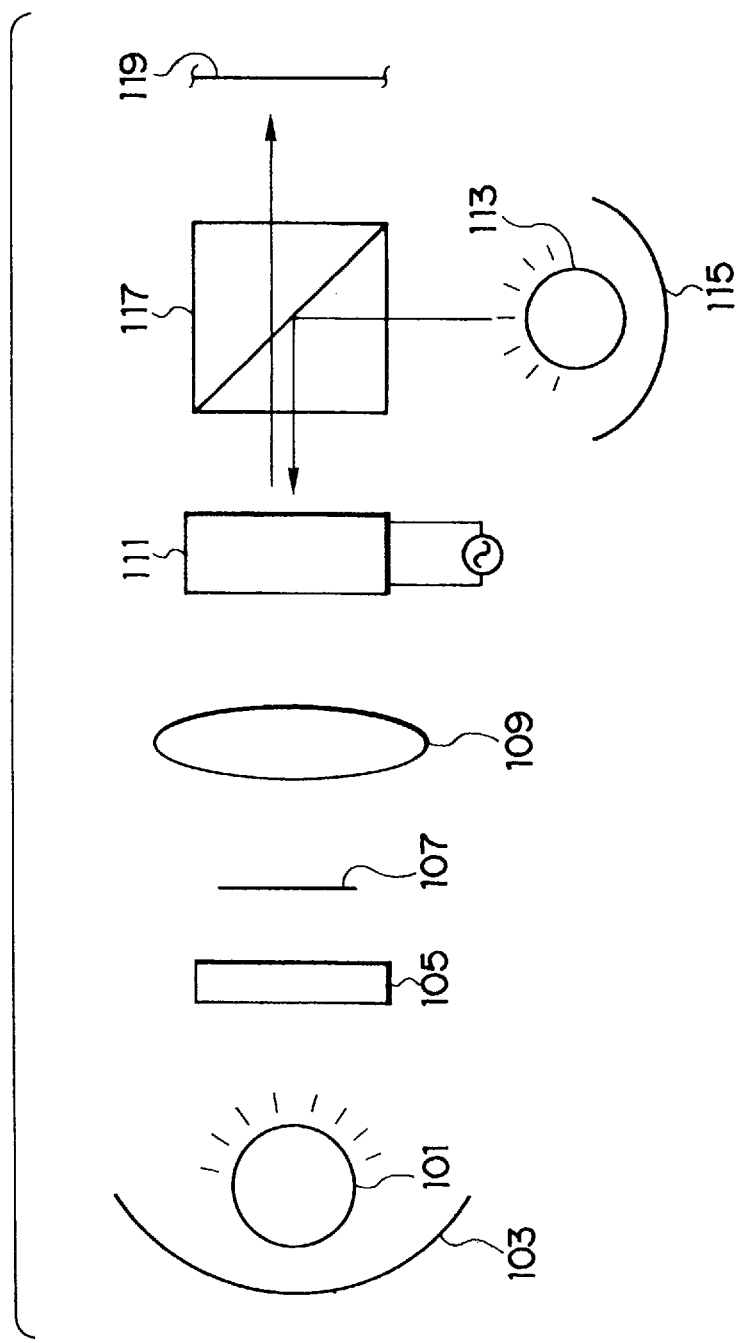
FIG. 1 is a schematic view which shows an embodiment of the present invention.

Referring now to the drawings, an embodiment of the present invention will be described hereinafter.

FIG. 1 shows an embodiment of the present invention. Light emitted from a light source 101 is reflected at a reflector 103 and is made incident on a negative film 107 via a variable diaphragm 105 formed by a variable ND filter or the like. Light transmitted through the negative film 107 is collimated by a lens 109 and then is made incident on a writing side of an SLM 111.

On the reading side of the SLM 111, light illuminated from the light source 113 is made incident via a beam splitter 117 after reflected at a reflector 115.

The SLM 111 has a structure in that a photoconductive layer, a light-absorbing layer, a dielectric multi-layer film mirror, and a liquid crystal layer serving as a light modulation layer, all of which are each formed in a flat plate, are nipped by a pair of transparent electrodes.

Light emitted from a reading side of the SLM 111 is made incident on a printing paper 119 via the beam splitter 117.

Next, a description will be given of exposure control with reference to FIG. 2 through FIG. 6.

Figure 2:
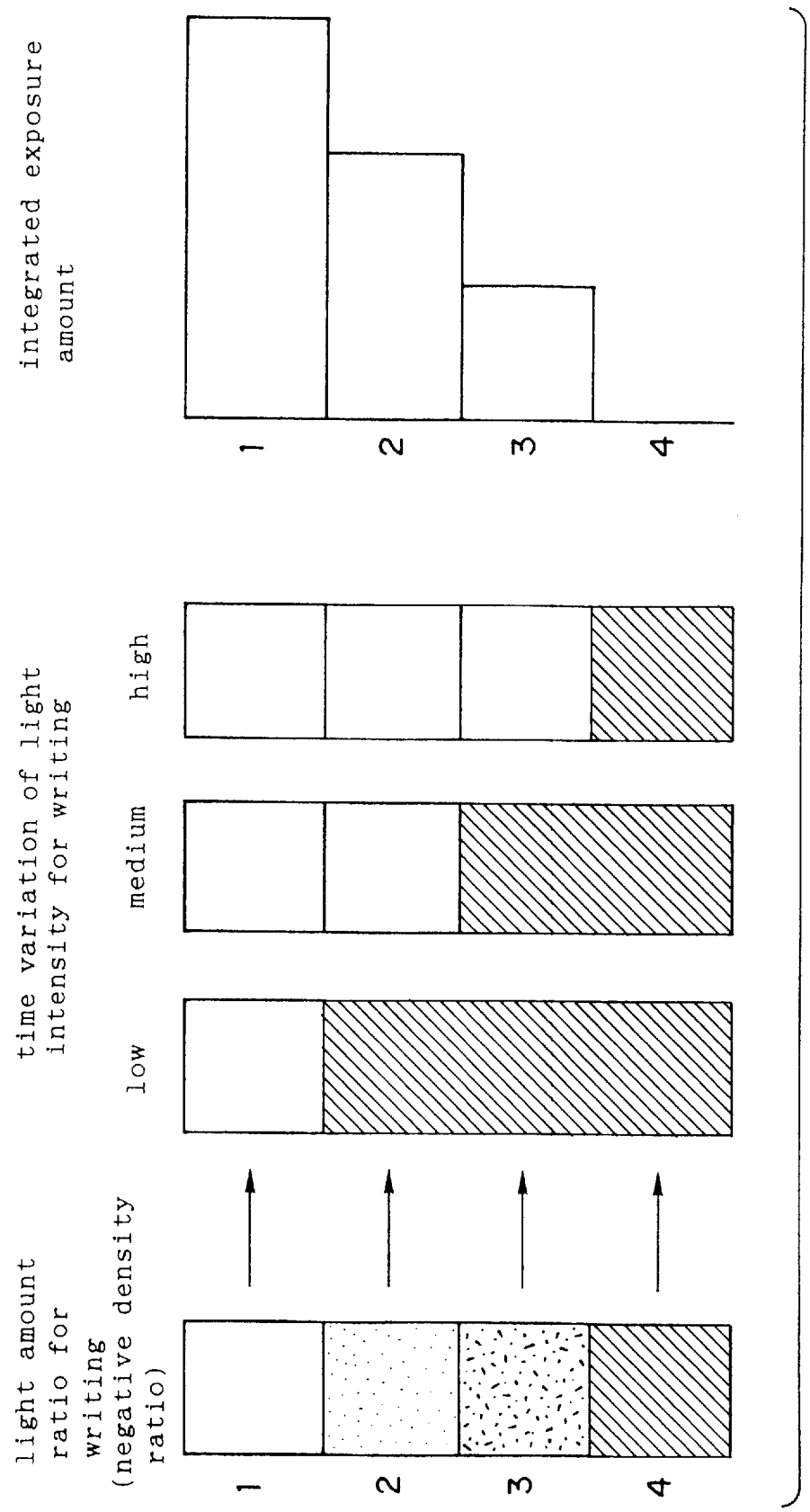
FIG. 2 is a diagram which shows a relationship between an incident light amount ratio on a writing side of an SLM, and an integrated amount of incident light on a printing paper.

FIG. 2 shows the relationship between an incident light amount ratio on the writing side of the SLM, and an integrated amount of light emitted from the reading side of the SLM and made incident on a printing paper. It should be noted that the light amount ratio for writing which is made incident on the writing side of the SLM corresponds to a density ratio of a negative film (which will be hereinafter referred to as negative density). Here, a description is given of a case in which four negative densities, density 1 through 4, are set.

When the intensity distribution of light for writing of the SLM corresponds to the negative density distribution as shown in FIG. 2, if the intensity of light for writing which is made incident on the writing side of the SLM is set low, an amount of reflected light from the reading side region corresponding to the negative density 1 increases.

When the intensity of light for writing is set medium, the amount of reflected light from the reading side region corresponding to the negative density 1 and 2 increases.

Further, when the intensity of light for writing is set high, the amount of reflected light from the reading side region corresponding to the negative density 1 through 3 increases.

When the duration for which light is emitted from the reading side of the SLM is set equal in each case of the above-described intensities of light for writing, light made incident on the printing paper is integrated in correspondence with the negative density distribution.

The intensity of light made incident on the writing side of the SLM is set by controlling the variable diaphragm.

As described above, the integrated amount of light which is made incident on the printing paper can be controlled by varying the intensity of light for writing. Accordingly, when the printing paper is exposed in a predetermined duration, the intensity of the light for writing is continuously varied within the predetermined duration. As a result, a continuous tone is obtained.

Figure 3:
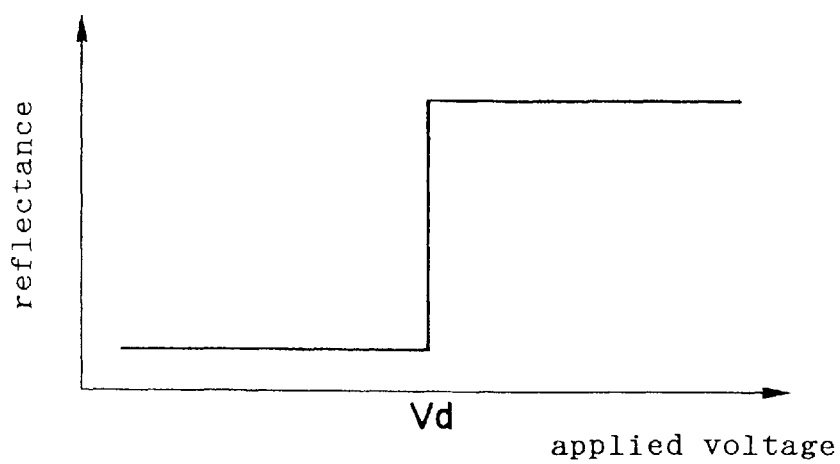
FIG. 3 is a graph showing a threshold characteristic of liquid crystal which forms the SLM.

When a threshold characteristic of liquid crystal which forms the SLM is, as shown in FIG. 3, constructed such that reflectance on the reading side of the SLM transits sharply at a predetermined threshold voltage Vd located as a boundary, i.e., when the threshold characteristic of the liquid crystal is a binary characteristic, an growing characteristic of the integrated amount of light made incident on the printing paper is shown in FIG. 4A. It should be noted that a driving voltage of the SLM is set above threshold voltage Vd.

In other words, when exposure process starts and the intensity of the light for writing continuously increases little by little, the amount of light corresponding to the volume indicated by the slanted lines in FIG. 4A is made incident on the printing paper in correspondence with thin and thick regions of the negative density until the exposure process ends. Namely, in a region whose negative density is thin (corresponding to the density 1), even when the intensity of the light for writing is low, light for reading is made incident on the printing paper. Further, in a region whose negative density is thick (corresponding to the density 4), as the light for writing becomes stronger, the light for reading is made incident on the printing paper.

When a speed at which the intensity of the light for writing gradually increases is set constant, the growing characteristic of the integrated amount of light varies linearly. Accordingly, the relationship between the negative density and an amount of exposure onto the printing paper is, as shown in FIG. 4B, defined as a monotone-increase characteristic.

Figure 5A:
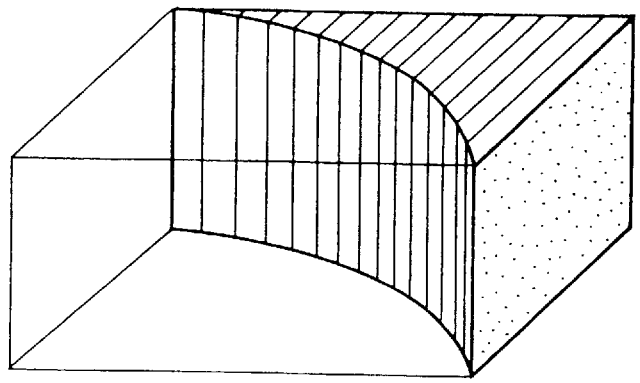
FIGS. 5A and 5B are diagrams each showing an growing characteristic of an integrated amount of incident light on the printing paper.
Figure 5B:
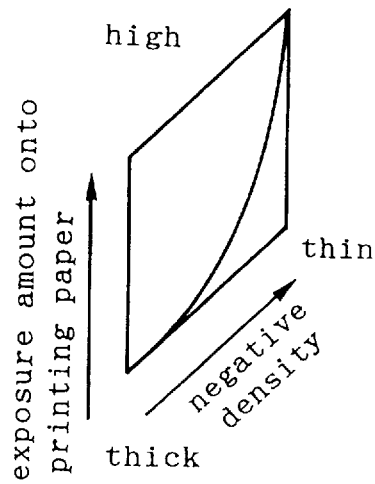

As shown in FIG. 5A, when the speed at which the intensity of the light for writing gradually increases is varied from a slow state to a rapid state, the growing characteristic of the integrated amount of light varies curvilinearly. Accordingly, as shown in FIG. 5B, the relationship between the negative density and the amount of exposure onto the printing paper is defined as a divergent characteristic.

Figure 6A:
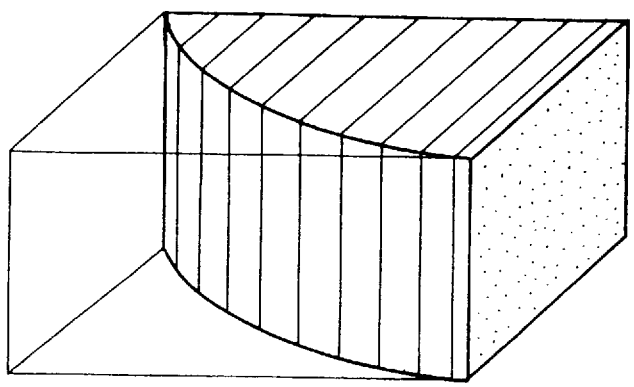
FIGS. 6A and 6B are diagrams each showing an growing characteristic of an integrated amount of incident light on the printing paper.
Figure 6B:
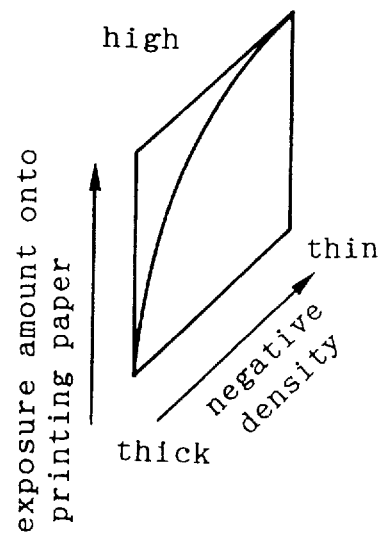

Further, as shown in FIG. 6A, when the speed at which the intensity of the light for writing gradually increases is varied from a rapid state to a slow state, the growing characteristic of the integrated amount of light varies curvilinearly. Accordingly, as shown in FIG. 6B, the relationship between the negative density and the amount of exposure onto the printing paper is defined as a convergent characteristic. It should be noted that a γ (gamma) characteristic of an exposure system can be corrected by using a non-linear characteristic shown in FIG. 6B.

In the foregoing, there was described a case in which the threshold characteristic of the liquid crystal which forms the SLM is a binary characteristic. However, even when the threshold characteristic of the liquid crystal contains a middle tone characteristic, it is possible to control exposure onto the printing paper by continuously varying the intensity of the light for writing of the SLM in a manner similar to the aforementioned.

Further, in the above-described embodiment, there was described a case in which exposure onto the printing paper is controlled by varying the intensity of the light for writing. However, the driving voltage of the SLM may be varied instead of the intensity of the light for writing, or the intensity of the light for writing and the driving voltage both may also be varied. Moreover, analog density information may be made incident on the writing side of the SLM so that an image can be written thereon, or digital density information obtained by electron-beam intensity modulation of a CRT (cathode ray tube) may be made incident on the writing side of the SLM so that an image can be written thereon. In addition to the image, information such as characters, dates and the like may be written on the SLM and exposed onto the printing paper together with a gradation image.

In accordance with the present invention described above, since the reflectance on the reading side of the SLM can be controlled linearly, it is possible to control an amount of light made incident on a photosensitive material in a non-stepwise manner. Accordingly, in comparison with a conventional case in which a gradation image is exposed depending upon the middle tone characteristic of the liquid crystal itself, the present invention makes it possible to expose a richer gradation image onto the photosensitive material.

The gradation image can be obtained even when the liquid crystal itself does not have the middle tone characteristic. For this reason, it is possible to freely select the liquid crystal which forms the SLM, thereby resulting in extension of the degree of design freedom of the liquid crystal.

In addition, various characteristics of an exposure system, such as γ characteristic, can be corrected by controlling the intensity of the light for writing of the SLM and/or the variable speed of the driving voltage.

What is claimed is:

1. A method for controlling exposure of light to a photosensitive material, comprising the steps of:

providing spatial light modulating means having a writing portion to which a light beam carrying gradation image information is projected and a reading portion from which a light beam for exposure is obtained in accordance with an intensity of the light beam to the writing portion;

projecting the writing portion with the light beam carrying the gradation image information;

while projecting the reading portion with another light beam, varying a reflectance on the reading portion in accordance with the gradation image information to obtain the light beam for exposure and to control the amount of exposure, wherein said varying step includes continuously varying an intensity of the light beam to the writing portion at a curvilinear rate, the rate changing from increasing slowly to increasing rapidly or from increasing rapidly to increasing slowly.

2. The method of claim 1, wherein the reflectance on the reading portion is controlled by continuously varying a driving voltage of the modulating means.

3. The method of claim 1, wherein the spatial light modulating means includes a liquid crystal device.

4. An apparatus for controlling exposure of light to a receiving means, comprising:

spatial light modulating means having a writing portion to which a light beam carrying gradation image information is projected and a reading portion from which a light beam for exposure is obtained;

means for producing the light beam carrying the gradation image information and to be projected to the writing portion;

means for projecting another light beam to the reading portion to obtain the modulated light beam for exposure;

means for varying reflectance on the reading portion in accordance with the gradation image to be exposed to the receiving means, wherein said means for varying reflectance continuously varies the intensity of the light beam to be projected to the writing portion with a curvilinear rate, the rate changing from increasing slowly to increasing rapidly or from increasing rapidly to increasing slowly.

5. The method of claim 1, wherein the reflectance on the reading portion is controlled by continuously varying a driving voltage of the modulating means.

6. The apparatus of claim 4, wherein the modulating means includes a liquid crystal device.

7. The apparatus of claim 4, wherein the producing means includes a negative film.

8. The apparatus of claim 4, wherein the receiving means includes a photosensitive material or an image sensing device.

9. The apparatus of claim 5, wherein the varying means includes a variable diaphragm.

* * * * *